United States Patent [19]

Ha et al.

[11] 3,829,745

[45] Aug. 13, 1974

[54] TECHNIQUES FOR MAINTAINING SUBSTANTIALLY CONSTANT TENSION IN WEB

[75] Inventors: In W. Ha, San Jose; John C. Fravel, Los Gatos, both of Calif.

[73] Assignee: Xerox Corporation, Stamford, Conn.

[22] Filed: Feb. 2, 1973

[21] Appl. No.: 329,054

[52] U.S. Cl. .................................................. 318/7

[51] Int. Cl. .......................................... B65h 77/00

[58] Field of Search .................................... 318/6, 7

[56] References Cited

UNITED STATES PATENTS

| | | | |
|---|---|---|---|
| 3,501,682 | 3/1970 | Jacoby | 318/7 |
| 3,704,401 | 11/1972 | Miller | 318/7 |
| 3,707,658 | 12/1972 | Hilsenbeck | 318/7 |
| 3,715,641 | 2/1973 | Mattes | 318/7 |
| 3,733,529 | 5/1973 | Ross et al. | 318/7 |
| 3,734,426 | 5/1973 | Howes et al. | 318/7 X |

*Primary Examiner*—B. Dobeck

*Attorney, Agent, or Firm*—Marn & Jangarathis

[57] ABSTRACT

A method of and apparatus for maintaining substantially constant tension in a web that is bi-directionally transported between first and second reels are disclosed in accordance with the teachings of the present invention. First and second motors are mechanically coupled to the first and second reels to effect direct reel-to-reel drive whereby the web is transported therebetween. First and second currents proportional to the respective angular velocities of the first and second reels are derived and at least one of the first and second currents is applied to at least one of the motors as a reverse biasing current therefor to provide a reverse torque to the motor whereby the rotation of the motor is opposed.

12 Claims, 4 Drawing Figures

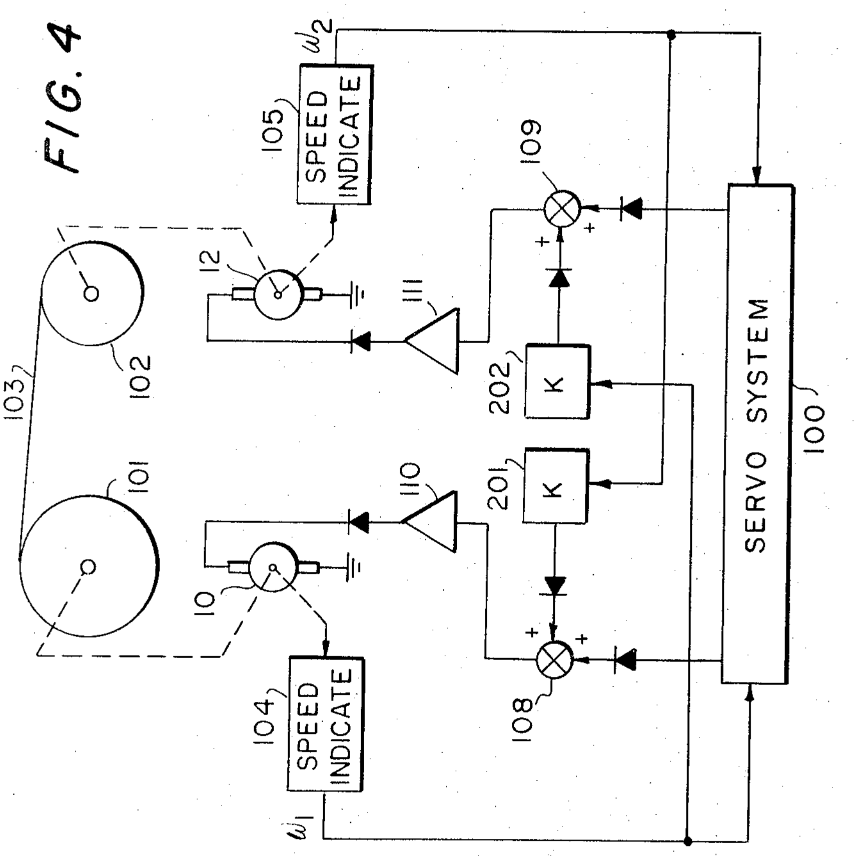
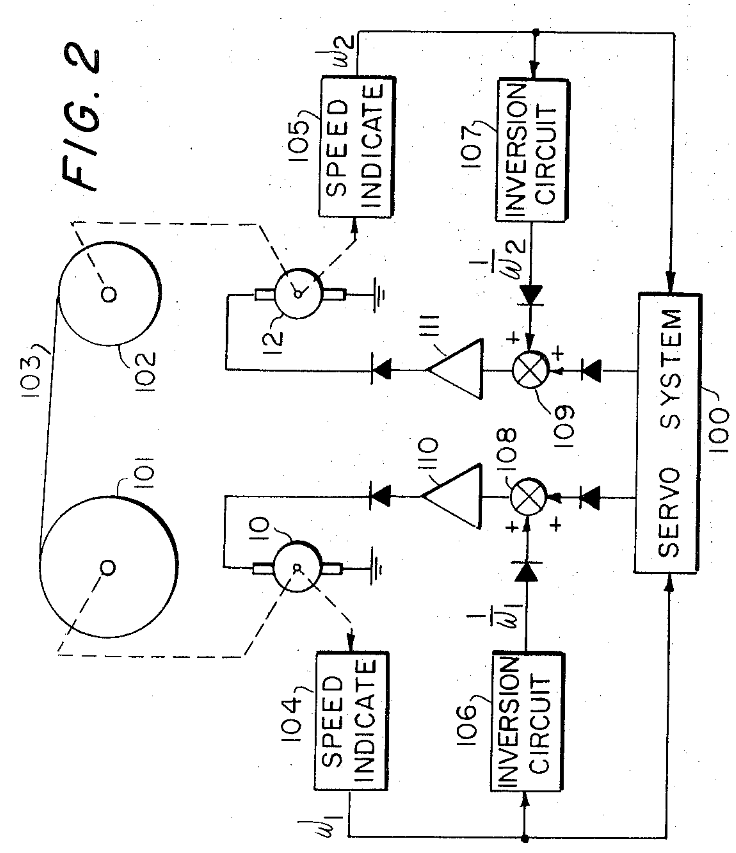
FIG. 3
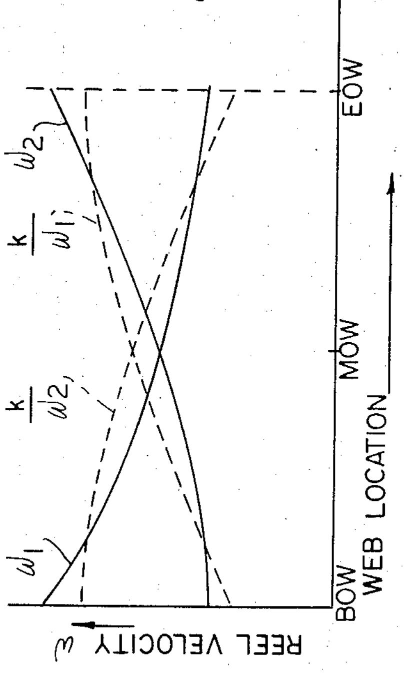

TECHNIQUES FOR MAINTAINING SUBSTANTIALLY CONSTANT TENSION IN WEB

This invention relates to a web transport system and, more particularly, to a method of and apparatus for maintaining substantially constant tension in a web that is transported between first and second reels.

BACKGROUND OF THE INVENTION

In various applications requiring operations on a web of material, a web must be transported past an operating station, usually from a web supply to a web take up mechanism. The web of material may assume diverse configurations dependent upon the particular use thereof and the operations performed thereon. Thus, the web may comprise a storage tape upon which information is recorded and retrieved, such as magnetic tape, paper tape, or the like; a film strip; a paper web or any other material disposed in web form.

For the particular web configuration of a storage tape, it is necessary to transport the tape through a recording station to effect the recording of information. Those of ordinary skill in the storage tape art recognize that the recording and reading stations may be combined in a single processing station including read/write heads to selectively execute information storage and retrieval operations. For the embodiment wherein the storage tape is magnetic recording tape, the processing station may include conventional magnetic read/write heads. Similarly, if the storage tape is paper tape, the processing station may include conventional paper punch mechanisms and punched tape reading mechanisms. Numerous applications employing such storage tape often require tape transport regulating apparatus capable of controlling the speed of the tape being transported and the direction of transportation.

Tape transport regulating apparatus heretofore employed in the prior art have utilized a driven capstan adapted for bi-directional operation to pull the tape from a supply reel to a take up reel. A reversible motor mechanically coupled to the capstan is controlled by a servo system to dictate the direction of travel of the tape, to maintain a substantially constant linear velocity of the tape through the processing station, to effect speed changes where required or upon command and to introduce substantial accelerations to the transported tape, e.g., during start and stop operations. For most, if not all, of the foregoing controller operations, it is necessary that a substantially constant tension be maintained in the tape, or the entire portion of the tape extending through the processing station, to maintain proper tape stacking on the respective tape reels and also to minimize the errors attending the recording and retrieval of information. The resulting tape tension achieved in capstan drive tape transport systems has generally been adequate. Desirable improvements in the maintenance of constant tape tension have been obtained by employing a vacuum column or tape buffer intermediate the supply reel and take up reel.

Although capstan drive tape transport systems have provided acceptable tape tension characteristics, the advent of compact tape processing systems has encouraged a substitute for the capstan drive technique. Hence, the use of the compact tape cassetts, for example, or other miniature reel-to-reel tape transport systems, is advantageously implemented by employing motors to directly drive the supply reel and the take up reel, thereby eliminating the tape drive capstan. Unfortunately, it has been found that, once the capstan is eliminated, the problem of maintaining a substantially constant tape tension intermediate the supply and take up reels becomes more pronounced. In an attempt to solve this problem, the prior art has proposed rigid control techniques to precisely regulate the tape driving motors. However, the implementation of such techniques has generally required complex and expensive control systems while not assuring a successful solution. An alternative suggestion toward maintaining a substantially constant tape tension in direct drive reel-to-reel systems has contemplated an electromechanical transducer interposed in the tape transport path and responsive to the passage of tape therepast to sense variations in tape tension and to permit appropriate compensation in response thereto. Such transducers have included spring biased potentiometer devices and spring biased strain gages to vary the energy supplied to a tape reel motor. An attendant disadvantage with such suggestion is the requirement of additional space necessitated by such transducers as with compact tape transport systems, such as the tape casette, that are now commercially available. The modifications to these compact tape transport systems that are necessary to adapt such systems for cooperation with the aforementioned transducers tends to defeat the inherent advantages offered by compact tape transport systems. Likewise, the proposal that the storage tape itself be modified to accommodate various types of unique tape tension sensors has not been enthusiastically received because of the undesirable and costly prerequisite of tape modification and likelihood of mutilation.

A still further suggestion to the solution of the problem of maintaining a substantially constant tape tension in direct drive reel-to-reel transport systems employs a linear tape speed sensor, such as an idler tachometer frictionally driven by tape movement, to regulate tension in accordance with tape speed. Although the idler tachometer requires no substantial modification of commercially available compact tape transport systems, tape tension is controlled as a function of the linear velocity of the tape and not the angular velocity of the tape reels. It is known that as the tape is paid out from the supply reel and received at the take up reel, the effective radii of the respective reels vary. The variations in effective radii are accompanied by variations in mass and inertia of the respective reels, thus influencing the factors affecting tape tension. However, in an accurate tape transport system the linear tape velocity is maintained substantially constant notwithstanding changes in the effective reel radii and corresponding changes in the angular velocities of the reels. Thus, it has been found that the idler tachometer is not effective to detect variations in the angular velocity of the take up reel, for example, and is thus largely insensitive to variations in those parameters influencing tape tension. Furthermore, it is recognized that there are many applications with which compact tape transport systems are readily adaptable, preferably in the absence of such idler tachometer devices.

OBJECTS OF THE INVENTION

Therefore, it is an object of the present invention to provide a method of and apparatus for maintaining substantially constant tension in a web transported between a supply reel and a take up reel.

It is another subject of the present invention to provide a method of and apparatus for maintaining substantially constant tension in a web without requiring an indication of the linear velocity of the web.

A further object of this invention is to provide a method of and apparatus for maintaining substantially constant tension in a web transported between first and second driven reels by providing a reverse torque to the drive motor of one of the reels that is directly proportional to the angular velocity of the other of said reels to thereby oppose the rotation of said drive motor.

Yet another object of the present invention is to provide a technique for maintaining substantially constant tension in a tape, which technique is readily adaptable for application to a compact tape transport system.

Another object of this invention is to provide an inexpensive and simple technique for maintaining substantially constant tape tension in a direct reel-to-reel tape drive system having no capstan drive.

Various other objects and advantages of the present invention will become clear from the following detailed description of an exemplary embodiment thereof, and the novel features will be particularly pointed out in connection with the appended claims.

SUMMARY OF THE INVENTION

In accordance with this invention, a method of maintaining substantially constant tension in a web that is transported between first and second driven reels, and the apparatus therefor, is provided wherein direct reel-to-reel drive is effected by first and second motors coupled to said first and second reels; first and second currents proportional to the respective angular velocities of said first and second reels are derived; and at least one of the derived currents is applied to at least one of the motors as a reverse biasing current therefor to provide a reverse torque to the motor whereby the rotation of said motor is opposed.

BRIEF DESCRIPTION OF THE DRAWINGS

The invention will be more clearly understood by reference to the following detailed description of an exemplary embodiment thereof in conjunction with the accompanying drawings in which:

FIG. 2 is a block diagram representing a technique for maintaining substantially constant tension in a transported web;

FIG. 3 is a graphical representation useful in understanding the present invention; and FIG. 4 is a block diagram of an exemplary embodiment of apparatus capable of executing the novel constant web tension technique in accordance with the present invention.

DETAILED DESCRIPTION OF THE INVENTION

Web transport control system

Figure 1:
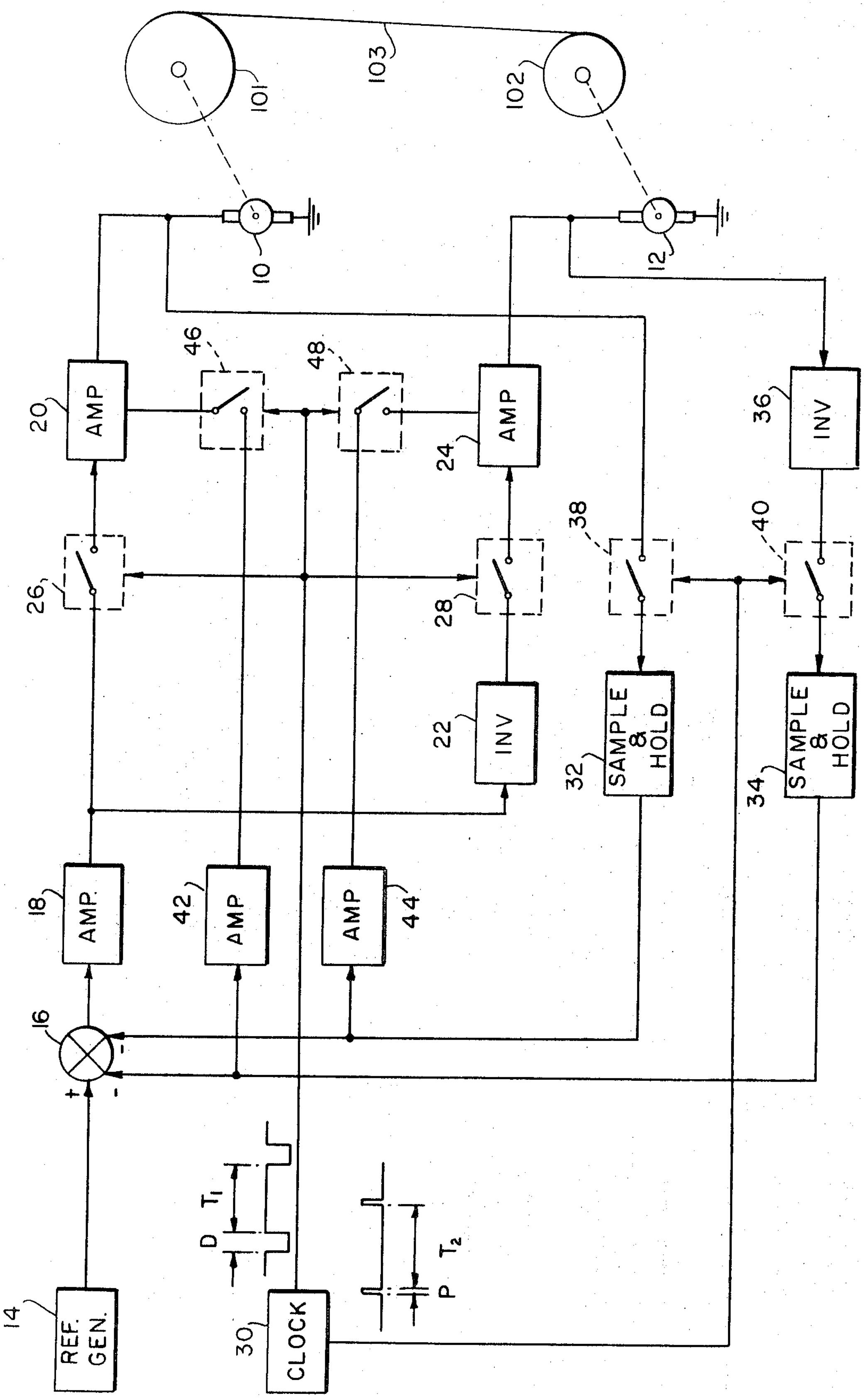
FIG. 1 is a block diagram of a web transport control system wherein the instant invention finds ready application.

Referring now to the drawings, wherein like reference numerals are used throughout, and in particular to FIG. 1, there is illustrated a web transport system comprised of first and second reels 101 and 102, web 103, drive motors 10 and 12 and a motor control system including reference means 14, error signal generating means 16, amplifying means 18 and sample and hold means 32 and 34. Web 103 may comprise any suitable material upon which operations are performed, such as information storage tape, a film strip, a paper web or the like. The web is adapted for bidirectional transport through a processing station, not shown. For the purpose of the present description, web 103 may comprise information storage tape and, in particular, the storage tape may be magnetic tape upon which information is recorded and retrieved in a manner well known to those of ordinary skill in the recording art. However, it should be clearly understood that web 103 is not limited solely to the configuration of magnetic recording tape and admits of numerous embodiments adapted for those applications for which use thereof is desirable.

The web 103, when used in an information storage and retrieval environment, is subjected to various accelerations, velocities and abrupt start and stop motions. As illustrated, the web is transported between reels 101 and 102. Depending upon the direction of transport, the web is paid out from a supply reel and received on a take up reel. Thus, if the web is transported from reel 102 to reel 101, for example, the reel 102 may be designated the supply reel and the reel 101 may be designated the take up reel. Conversely, when the direction of web transport is reversed such that web 103 is paid out from reel 101, for example, then reel 101 may now be designated the supply reel and reel 102 is designated the take up reel. Therefore, it is readily appreciated that the designations "suppply reel" and "take up reel" are not fixed to identify specific components of the illustrated apparatus but, on the contrary, conveniently describe the relative functions of reels 101 and 102 when web 103 is transported therebetween in a first or second direction.

Motors 10 and 12, which may be DC motors, are mechanically coupled to reels 101 and 102, respectively, and are adapted to respond to the selective energization thereof to exert a rotational force on the reel coupled therto to drive said coupled reel. Reel 101 is adapted to rotate in a counterclockwise direction when motor 10 is appropriately energized to thus function as a take up reel. Hence, the driving of reel 101 by motor 10 results in a pulling of the web from reel 102 to reel 101 and a corresponding rotation of reel 102. Conversely, the direction of web transport is reversed when motor 12 is energized to drive reel 102 in a clockwise rotational direction. The energization of motor 12 causes reel 102 to function as a take up reel and results in a pulling of the web from reel 101 to reel 102 and a corresponding rotation of reel 101. It should be appreciated that, if desired, motors 10 and 12 may be concurrently energized to cooperate in the transporting of the web therebetween. If the motors are, for example, conventional DC motors, the direction of rotation thereof may be dependent upon the polarity of the energy supplied thereto. It may now be appreciated that motors 10 and 12 cooperate with reels 101 and 102 to form a direct drive reel-to-reel web transport device admitting of particular utility in compact tape transport systems such as the compact tape cassette.

The direction and speed of transport of web 103 is a function of the operation of motors 10 and 12, the motors being regulated by the control system comprised of reference means 14, error signal generating means 16, amplifying means 18 and sample and hold means 32 and 34. Reference generating means 14 is adapted to supply a DC reference signal admitting of a magnitude representing a desired web velocity and of a polarity representing a desired direction of web transport. For example, a reference signal admitting of positive polarity may be assumed to represent forward web drive such that motor 10 is supplied with DC energy. Conversely, a reference signal admitting of negative polarity may be assumed to represent reverse web drive whereby motor 12 is supplied with DC energy. Of course, it is appreciated that the foregoing assumptions of polarity are not intended to be limiting and the reference signal may admit of any polarity desired to represent the particular directions of web transportation. The magnitude of the reference signal produced by reference generating means 14 may be derived from suitable switching signals that are manually or automatically generated. Thus, if the web transport system is operable under operator control, manually operable switches, not shown, may be provided to effect rapid, slow, or intermediate web transport speeds as well as forward or reverse transport directions. Alternatively, if the web transport system is subject to machine control, for example an electronic digital computer or the like, appropriate logic signals may be provided to command rapid, slow or intermediate web transport rates as well as forward or reverse transport directions. Reference generating means 14 may include a conventional logic gating network responsive to the manually operable switches or machine generated logic signals to produce a reference signal of proper magnitude and polarity.

Error signal generating means 16 is coupled to reference means 14 and to sample and hold networks 32 and 34, respectively. The error signal generating means is adapted to generate an output signal, hereafter an error signal, proportional to the difference between the input signal and the feedback signals applied thereto. Error signal generating means 16 may thus comprise a conventional differencing or subtracting circuit such as a conventional differential amplifier, an algebraic resistance combining network, an operational amplifying circuit or the like.

Error signal generating means 16 is coupled to amplifying means 18, the latter amplifying means being adapted to apply operating energy to either motor 10 or motor 12. Amplifying means 18 may comprise a conventional amplifying circuit responsive to the error signal supplied thereto and adapted to increase the magnitude of said signal to thereby supply motor 10 or motor 12 with sufficient operating energy compatible therewith. The output of amplifying means 18 is supplied to motor 10 by amplifying means 20. Amplifying means 20 may comprise a motor driving circuit coupled to the armature of motor 10 to supply the armature windings with energizing current proportional to the amplified output of amplifying means 18. More particularly, amplifying means 20 is adapted to respond to a unidirectional signal supplied thereto by amplifying means 18. For the purpose of the present description, amplifying means 20 may be assumed to respond to a positive signal, such as a positive DC signal, to supply positive energizing current, e.g., direct current, to motor 10. It is, of course, understood that amplifying means 20 may be responsive to a negative signal. Additionally, the output of amplifying means 18 is coupled to the armature windings of motor 12 via the series connection of inverting means 22 and amplifying means 24. Amplifying means 24 may be similar to aforementioned amplifying means 20. Inventing means 22 is adapted to reverse the polarity of a signal supplied thereto such that a positive signal is supplied to amplifying means 24 in response to a negative signal provided by amplifying means 18. Conversely, a negative signal is applied to amplifying means 24 in response to a positive signal provided by amplifying means 18. Hence, inverting means 22 may comprise a conventional unity gain inverting amplifier, such as an operational amplifier or other conventional polarity negation circuit.

As illustrated in FIG. 1, interrupting means are provided in the series circuit extending between amplifying means 18 and motor 10 and in the series circuit extending between amplifying means 18 and motor 12, respectively. The interrupting means perform a function subsequently described and may be comprised of conventional switching devices such as FET switches, transistor switches, electromechanical switches, or the like. The interrupting means are here depicted as switch means 26 interposed between amplifying means 18 and amplifying means 20, and switch means 28 interposed between inverting means 22 and amplifying means 24. Alternatively, switch means 28 may be positioned to couple amplifying means 18 to inverting means 22. The switch means 26 and 28 include control input terminals coupled in common relationship to clock means 30. Clock means 30 is adapted to generate periodic pulses having a duration D and a repetition period $T_1$ and exhibiting a relatively small duty cycle. The clock means may thus comprise a conventional oscillator such as an astable multivibrator, or the like, conventionally employed to function as a timing circuit. Such clock means are well known to those of ordinary skill in the art. For the purpose of the present description, the pulses produced by clock means 30 and applied to switch means 26 and 28 may be negatively poled pulses which periodically interrupt a constant positive voltage level. Switch means 26 and 28 are each capable of assuming a first, or closed, state in response to the positive voltage level applied thereto by clock means 30. The switch means are deactivated to thereby assume their respective second, or opened, states in response to the pulses of duration D generated by clock means 30. Since the pulse duration D is much less than the repetition period $T_1$, it is recognized that switch means 26 and 28 function to periodically interrupt the series connection between amplifying means 18 and amplifying means 20 as well as the series connection between amplifying means 18 and amplifying means 24.

Sample and hold means 32 is coupled to the armature of motor 10 via switch means 38. The sample and hold means is adapted to sample the back EMF induced in motor 10 when coupled thereto via switch means 38. Similarly, sample and hold means 34 is coupled to the armature of motor 12 by switch means 40 and inverting means 36 to sample the back EMF induced in the armature of motor 12. Sample and hold means 32 and 34 are similar and each may comprise a conventional sampling gate coupled to a storage capacitor. Activation of the sampling gate permits the voltage coupled thereto to be applied to the storage capacitor. The voltage thus applied to the storage capacitor is maintained thereon until subsequent activation of the sampling gate. Switch means 38 may be similar to aforedescribed switch means 26 and is adapted when energized to interconnect sample and hold means 32 to motor 10. Accordingly, switch means 38 includes a control input terminal coupled to clock means 30. A periodic energizing signal is capable of being supplied to the control input terminal of switch means 38 by clock means 30. The periodic energizing signal may comprise a train of positively poled pulses having a repetition period $T_2$ and a pulse duration P and exhibiting relatively small duty cycle. It may be assumed, for the present discussion, that pulse duration P is less than the aforedescribed pulse duration D. Switch means 40 is similar to switch means 38 and includes a control input terminal coupled to clock means 30 in common relationship with the control input terminal of switch means 38.

Inverting means 36 is similar to aforedescribed inverting means 22 and is adapted to invert the polarity of the voltage applied thereto by motor 12. It will soon be understood that inverting means 36 provides sample and hold means 34 with a voltage exhibiting a polarity identical to the polarity of the voltage applied to sample and hold means 32. More particularly, it may be appreciated that if motor 10 is energized so as to rotate in a first, or forward direction, such as a counterclockwise direction, such first direction may be considered a positive direction whereby the back EMF induced thereacross admits of a corresponding first polarity. It will hereby be assumed that the polarity of the back EMF induced across forward drive motor 10 when said motor is driven in a forward direction is positive. Nevertheless, it should be recognized that this designation of the polarity of the back EMF induced across motor 10 is not intended to be limiting. Thus, if desired, the back EMF may exhibit a negative polarity when motor 10 is driven in its forward direction. It is appreciated that when motor 10 is driven in tis forward direction, the armature of motor 12 rotates in a similar direction, such as the counterclockwise direction. Although this direction may be considered the forward direction for the transport of web it is opposite to the normal rotation assumed by the armature of the motor 12 when said motor is positively energized. Hence, the back EMF induced across motor 12 when said motor rotates in the counterclockwise direction, for example, is opposite in polarity to that of the back EMF induced across motor 10. Hence, inverting means 36 is provided to invert the polarity of the back EMF induced across motor 12 such that the polarity of the voltage applied to sample and hold means 34 is now identical to the polarity of the voltage applied to sample and hold means 32. Similarly, when motor 12 is positively energized to thus reverse the direction in which the web is transported, it is appreciated that the armature thereof now rotates in a second, or clockwise direction. The armature of motor 10 likewise rotates in the clockwise direction. This direction of armature rotation results in, for example, a back EMF induced across motor 12 admitting of a positive polarity. However, the back EMF now induced across the armature of motor 10 admits of a negative polarity. Consequently, inverting means 36 serves to reverse the polarity of the back EMF induced across motor 12 to thereby provide sample and hold means 34 with a voltage having a polarity identical to the polarity of the voltage now applied to sample and hold means 32. It should be readily apparent that, if desired, inverting means 36 may be alternatively provided at the input to sample and hold means or at the output of either sample and hold means 32 or sample and hold means 34.

It is recalled that the outputs of sample and hold means 32 and 34 are fed back to error signal generating means 16. In addition, sample and hold means 32 is coupled to amplifying means 44 and sample and hold means 34 is coupled to amplifying means 42. The outputs of amplifying means 42 and 44 are coupled to amplifying means 20 and 24, respectively, via switch means 46 and 48. Amplifying means 42 and 44 are utilized to maintain substantially constant tension in web 103 that is transported by the apparatus of the illustrated system. Further description of amplifying means 42 and 44 and the manner in which substantially constant web tension is maintained is provided in detail hereinbelow. Switch means 46 and 48 are similar to aforedescribed switch means 26 and 28 and include control input terminals connected in common relationship to the control input terminals of the aforedescribed switch means and, consequently, to clock means 30.

The operation of the web transport control system illustrated in FIG. 1 will now be described. Let it initially be assumed that the transported web 103 is to be driven in a first, or forward direction from reel 102 to reel 101. Accordingly, reference generating means 14 produces a positive DC signal admitting of a predetermined magnitude. It is recalled that this positive DC signal may be derived from the operation of manually operable switches or logic command signals. If motor 10 and motor 12 are initially at rest, the voltages stored in sample and hold means 32 and 34 and supplied to error signal generating means 16 are essentially zero. Accordingly, error signal generating means 16 is provided with the positive DC signal supplied thereto by reference generating means 14. The difference between the signal supplied by reference generating means 14 and sample and hold means 32 and 34, i.e., the error signal, is recognized as being essentially the positive DC signal produced by the reference generating means. The positive DC error signal is amplified by amplifying means 18 and applied via switch means 26 to amplifying means 20 and through inverting means 22 and switch means 28 to amplifying means 24. It may be further assumed that switch means 26 and 28 assume their respective closed states to thus provide a continuous transmission channel to amplifying means 20 and 24, respectively, from amplifying means 18. Amplifying means 20 operates upon the amplified positive DC error signal supplied thereto by amplifying means 18 to generate a positive direct current of sufficient magnitude to energize motor 10. It may be appreciated that the energizing current now supplied to motor 10 by amplifying means 20 admits of a maximum amplitude. At this time, the amplified positive DC error signal produced by amplifying means 18 is inverted in polarity by the inverting means 22 to supply amplifying means 24 with an amplified negative DC signal. It is recalled that amplifying means 20 and 24 are each responsive to a unidirectional signal supplied thereto which signal, for the purpose of the instant discussion, has been assumed to exhibit a positive polarity. Consequently, amplifying means 24 is not responsive to the amplified negative DC signal supplied thereto by inverting means 22 and, therefore, does not supply an energizing current to motor 12. The supply of positive energizing current to motor 10 initiates the operation thereof resulting in the rotation of the armature of motor 10 and reel 101 coupled thereto. As the motor is energized, the angular velocity of reel 101 is increased and web 103 is transported from reel 102 to reel 101. As the web is paid out from reel 102 to the reel 101, the armature of motor 12, which is mechanically coupled to the reel 102, is rotated in a corresponding direction, which direction is opposite to that normally rotated when said motor 12 is energized.

While motor 10 is energized, clock means 30 operates to supply periodic negatively poled pulses to switch means 26 and 28. It is appreciated that as each pulse of duration D is applied to the switch means, the continuous transmission channel extending between amplifying means 18 and amplifying means 20 as well as the continuous transmission channel extending from amplifying means 18 to amplifying means 24 is interrupted. The period of interruption is, of course, substantially equal to the pulse duration D. The deactivation of switch means 28 in response to the negatively poled pulse of duration D applied thereto has no appreciable affect upon amplifying means 24 inasmuch as the amplifying means does not respond to the amplified negative DC signal now supplied thereto. However, the deactivation or switch means 26 interrupts the supply of the amplified positive DC signal to amplifying means 20, and consequently, interrupts the positive DC energizing current heretofore supplied to motor 10. Nevertheless, in view of the inertia of the armature of the motor, said armature rotation of the armature windings through the magnetic field generated by the energized field windings of the motor 10 induces a back EMF across the armature. Additionally, the inductive kick component equal to $-L di/dt$ is generated at the armature of motor 10 in response to the interruption in the supply of energizing current thereto. The inductive kick component together with a residual IR voltage drop attributed to the DC energizing current that had been stored in the armature windings are forced to decrease at a rate that exceeds the rate of decay intrinsic to the armature of the motor 10 by means described in detail in copending application Ser. No. 329,055, filed on Feb. 2, 1973, and assigned to Xerox Corporation, the assignee of the present invention. It may be appreciated that the inductive kick component and the IR voltage drop are substantially dissipated during a first portion of the pulse duration D. Once the inductive kick component and IR voltage drop are so dissipated, it is recognized that the voltage now provided at the armature of motor 10 is substantially equal to the back EMF induced thereacross.

The positively poled pulses applied to switch means 38 and 40 by clock means 30 are accurately synchronized with the negatively poled pulses generated by the clock means such that each positively poled pulse of duration P occurs during a relatively small terminating portion of pulse duration D. Moreover, duration P is here selected to be less than the duration D and, for example, may be 10 percent of said duration D. Switch means 38 and 40 respond to the clock pulses applied thereto to assume their respective closed states thereby providing continuous transmission channels between motor 10 and sample and hold means 32 and between motor 12 and sample and hold means 34, respectively. Sample and hold means 32 is thus activated to sample the back EMF induced across motor 10 and supplied thereto by switch means 38. A voltage representing the actual angular velocity of reel 101 is thus stored in sample and hold means 32.

It is recognized that as web 103 is paid out from the reel 102 to the reel 101, the armature of motor 12 rotates through the magnetic flux generated by the energized field windings of the motor. Consequently, a back EMF proportional to the angular velocity thereof is induced across motor 12. In accordance with the initially assumed parameters, positive energization of motor 10 results in a back EMF exhibiting positive polarity induced thereacross and a back EMF exhibiting negative polarity induced across motor 12. The negative polarity of the back EMF induced across motor 12 is inverted by inverting means 36 and then supplied by switch means 40 to sample and hold means 34. It is readily apparent that sample and hold means 32 and 34 now store voltages proportional to the angular velocities of reels 101 and 102, respectively.

Error signal generating means 16 now generates an error signal proportional to the difference between the reference voltage applied thereto by reference generating means 14 and the sampled back EMF components fed back thereto by sample and hold means 32 and 34, respectively. Hence, the error signal applied to amplifying means 18 is indicative of the deviation between the actual velocity of the transported web and the desired velocity thereof.

At the conclusion of pulse duration D, a positive energizing signal is applied to the control input terminals of switch means 26 and 28 by clock means 30. These switch means are now positively activated to reconnect amplifying means 20 to amplifying means 18 and to reconnect amplifying means 24 to amplifying means 18. If it is assumed that the transported web has not yet attained the desired velocity thereof, it is manifest that the magnitude of the reference signal generated by reference generating means 14 exceeds the combined magnitudes of the sampled back EMF components stored in sample and hold means 32 and 34. Hence, the error signal is a positive DC signal. In accordance with the aforedescribed operation, amplifying means 20 responds to the amplified positive DC signal applied thereto to supply a positive energizing current to motor 10 admitting of a magnitude determinative of the operating speed of the motor. More particularly, since the actual angular velocity of reel 101 is now approaching the desired velocity thereof to thus drive the web at the speed determined by the reference generating means 14, it is recognized that the magnitude of the energizing current supplied to motor 10 need not be as great as that of the energizing current previously supplied thereto. Nevertheless, since the energizing current is a direct function of the error signal produced by error signal generating means 16, the angular velocity of reel 101 is increased to further approach the desired angular velocity thereof and, consequently, to reduce the magnitude of the generated error signal.

During the next negatively poled pulse interval D, switch means 26 and 28 are interrupted to thus interrupt the energizing current supplied to motor 10. Subsequently, when the inductive kick component and IR voltage drop, induced across the motor 10, in response to the interruption of the energizing current, has been dissipated, switch means 38 and 40 respond to the positively poled pulse of duration P to enable sample and hold means 32 and 34, respectively, to sample and store therein the respective back EMF components representing the angular velocities of reels 101 and 102.

The foregoing operation is repeated until web 103 is transported at a velocity corresponding to the desired velocity represented by the magnitude of the reference signal generated by reference generating means 14. When such desired velocity is actually attained, the error signal generated by error signal generating means 16 is reduced substantially to zero and amplifying means 20 supplied motor 10 with a positive DC energizing current admitting of a sufficient magnitude to maintain the motor at the proper angular velocity to drive the web accordingly. It is apparent that if the energization of motor 10 results in a web velocity that exceeds the desired velocity therefor as represented by the reference signal generated by reference generating means 14, the combined sampled back EMF components stored in sample and hold means 32 and 34 exceeds the magnitude of the reference signal. Hence, the resulting DC error signal admits of a negative polarity. Amplifying means 20 is thus supplied with an amplified DC error signal to which the amplifying means is not responsive. However, inverting means 22 serves to provide amplifying means 24 with an amplified positive DC error signal to which the latter amplifying means responds to apply a positive DC energizing current to motor 12. It should be noted that, although the magnitude of the energizing current now supplied to motor 12 is not sufficient to effect a reversal in the rotation of the armature thereof, such energizing current does act to oppose the rotation of the armature and thus to retard the velocity of the driven web. The manner in which the illustrated apparatus accurately regulates the speed of transported web to thus conform to a desired speed should now be readily apparent.

Although described in detail hereinbelow, it is here noted that the purpose of amplifying means 44 is to supply reverse biasing current to motor 12 when motor 10 is energized to thus maintain substantially constant tension in the web transported from reel 102 to reel 101. As is apparent from FIG. 1, the reverse biasing current is a function of the angular velocity of reel 101. Similarly, amplifying means 42 serves to supply motor 10 with a reverse biasing current proportional to the angular velocity of reel 102 to maintain substantially constant web tension when the web is transported from reel 101 to reel 102. Since it is preferred to eliminate the supply of current to either motor 10 or motor 12 during the aforedescribed periodic intervals of interruption, the transmission channel from amplifying means 42 to amplifying means 20 to motor 10 and the transmission channel from amplifying means 44 to amplifying means 24 to motor 12 are likewise interrupted by the operation of switch means 46 and 48 in response to the negatively poled pulses generated by clock means 30. Further description of amplifying means 42 and 44 and the manner in which the operation of said amplifying means effects substantially constant tape tension is provided in detail below with respect to FIGS. 2 and 4.

The foregoing explanation has described the operation of the illustrated apparatus when motor 10 is energized to drive web 103 from reel 102 to reel 101. The operation of the web transport control system to energize motor 12 to thus drive the web from reel 101 to reel 102 is substantially similar. To effect a reverse drive of the web, the polarity of the reference signal generated by reference generating means 14 is opposite to that of the reference signal when forward web drive is desired. Hence, in accordance with the previously assumed examples, reference generating means 14 now generates a negative DC signal admitting of a magnitude representing the desired velocity of web 103. If motors 10 and 12 are initially at rest, error signal generating means 16 generates a negative DC error signal proportional to the reference signal magnitude. An amplified negative DC error signal is supplied by amplifying means 18 to amplifying means 20 via closed switch means 26 and to inverting means 22. Since amplifying means 20 is adapted to respond to a unidirectional signal applied thereto, which unidirectional signal has been heretofore assumed to be a positive signal, the amplifying means is now non-responsive to the amplified error signal and does not supply positive DC energizing current to motor 10. However it is apparent that the amplified negative DC error signal applied to inverting means 22 is inverted thereby to provide amplifying means 24 with an amplified positive DC signal. Consequently, amplifying means 24 is now capable of responding to the signal applied thereto to supply motor 12 with a positive DC energizing current. The positive energization of motor 12 effects a rotation thereof in a direction opposite to that previously described hereinabove. For example, the armature of motor 12 may now rotate in a clockwise direction to effect a corresponding rotation of reel 102 and a reversal in the direction in which the web 103 is now driven. Web 103 is now paid out from reel 101 and wound upon the driven reel 102. Consequently, the armature of motor 10 also experiences a reversal in the rotational direction thereof.

As is now understood, the continuous transmission channel between amplifying means 18 and amplifying means 20 as well as the continuous transmission channel between amplifying means 18 and amplifying means 24 is interrupted upon the occurrence of a negatively poled pulse of duration D. Hence, when clock means 30 applies a negatively poled pulse to switch means 26 and 28, the respective switch means are deactivated and the energization of motor 12 is now interrupted. The inductive kick component and IR voltage drop induced across motor 12 in response to the interruption in the supply of energizing current thereto are rapidly dissipated in the manner described in copending application Ser. No. 329,055; and, subsequent to the dissipation of the inductive kick component and IR voltage drop, clock means 30 supplies a positively poled pulse of duration P to switch means 38 and 40. The resultant closing of switch means 38 and 40 enables sample and hold means 32 and 34, respectively, to sample the back EMF components induced across the armatures of motors 10 and 12 respectively, and to store such sampled components. Since the armature of motor 10 is now rotating in a reversed direction, the polarity of the back EMF induced thereacross is assumed negative. Consequently, a negative voltage representing the actual angular velocity of reel 101 is now stored in sample and hold means 32. Also, since motor 12 is now positively energized by the positive DC energizing current supplied thereto, the angular rotation thereof is effective to induce a positive back EMF component thereacross. The polarity of this induced back EMF component is inverted by inverting means 36 and, consequently, a negative voltage representing the actual angular velocity of reel 102 is now stored in sample and hold means 34.

Error signal generating means 16 now compares the negative DC reference signal applied thereto by reference generating means 14 and the positive DC voltages fed back thereto by sample and hold means 32 and 34. Consequently, if the transported web has not as yet attained the velocity represented by the reference signal generated by reference generating means 14, the error signal generating means supplies a negative DC error signal to amplifying means 18. Hence, the aforedescribed operation of the illustrated apparatus is repeated until motor 12 is supplied with sufficient DC energizing current to thus drive the web at the speed selected by the reference signal. A more detailed disclosure of alternative speed regulating techniques that might be employed with the illustrated web transport control system is provided in copending application Ser. No. 329,056, filed on Feb. 2, 1973.

In the foregoing description, the polarities of the signals generated by reference generating means 14 as well as the polarities of the energizing currents supplied to motors 10 and 12, respectively, are understood to be merely exemplary. Consequently, forward web drive may be initiated by a negative DC reference signal and reverse web drive may be initiated by a positive DC reference signal. Alternatively, the selective transport of web 103 in the forward and reverse directions may be determined by selectively activating, or closing, one of switch means 26 and 28 instead of being determined by the polarity of the reference signal. For example, if switch means 26 is closed, amplifying means 20 is activated to energize motor 10. Conversely, if switch means 28 is closed, amplifying means 24 is activated to energize motor 12. In this mode of operation, the polarity of the reference signal generated by reference generating means 14 is not determinative of transport direction, and therefore, the reference signal may exhibit uniform polarity irrespective of desired direction. Similarly, the polarity of the voltages stored in sample and hold means 32 and 34, and representative of the actual angular velocities of reels 101 and 102, respectively, may exhibit uniform polarity notwithstanding the particular direction of rotation thereof. Likewise, amplifying means 20 and 24 may be responsive to negative signals supplied thereto to thus supply respective motors 10 and 12 with suitable DC energizing currents. Furthermore, each of the illustrated amplifying means may, if desired, be conventional inverting amplifiers to produce correspondingly poled amplified signals. Also, the back EMF components induced across the armatures of motor 10 and motor 12, respectively, may exhibit polarities opposite to those described hereinabove. Moreover, the duration D of the negatively poled pulses produced by clock means 30 is adapted to be a relatively small portion of the repetition period $T_1$. An exemplary duration D may be 20 percent of the repetition period. Hence, motors 10 and 12 are selectively energized 80 percent of the time and the energizing currents supplied thereto are interrupted for only 20 percent of the time. It is, of course, recognized that the duration D may be adjusted to be any desired value. Similarly, the duration P of the positively poled pulses produced by clock means 30 may preferably be approximately 10 percent of the aforementioned duration D. Any desired duration of the positively poled pulses may be utilized to effect an accurate sampling of the back EMF components induced across motors 10 and 12. To provide a typical numerical example, the repetition period $T_1$ may be 5 milliseconds, duration D may be 1 millisecond and duration P may be 0.1 milliseconds. In this manner, the interval during which motor energizing current is interrupted is small enough such that the continued inertial operation of the motor is not significantly reduced by frictional components and by the load exerted thereon. Nevertheless, the interval of interruption is sufficient to permit the inductive kick component and IR voltage drop to be dissipated, as is described in copending application Ser. No. 329,055, and to further permit an accurate sampling of the induced back EMF component. Furthermore, although the illustrated switch means have been described as being interposed in series circuits to thus determine the continuity of transmission channels, it is recognized that any suitable devices may be employed to effect an interruption in the supply of energizing currents to motors 10 and 12 and to enable a periodic sampling of the back EMF components induced thereacross. Hence, it is apparent that alternative embodiments are contemplated whereby amplifying means 18 might be periodically deactivated or amplifying means 20 and 24 might be periodically rendered inoperative. Also, since the described switch means are recognized as being responsive to pulses applied thereto by clock means 30 to assume their respective opened or closed states, it is manifest that the polarities of the applied pulses may be positive or negative, consistent with the operable responsiveness of the switch means. The exemplary pulse polarities are therefore not intended to be limiting and have been referenced merely for convenience of explanation.

Web tension control

It is appreciated that, notwithstanding the high accelerations, various speeds and abrupt start and stop operations to which web 103 is subjected, it is preferred to maintain substantially constant tension in the web to thus maintain proper stacking on the reels and minimize errors attendant information recording and retrieval operations. Additionally, when the web is transported at a constant linear velocity, the tension therein should remain substantially constant even as the effective radii of reels 101 and 102 (and thus the angular velocities of said reels) vary. It is known that the web tension force $F$ is a function of the torque $T$ exerted on a reel and the effective radius of the reel $r$ such that $F = T/r$. Since the effective radius $r$ varies as the web is paid out (or received), a constant torque $T$ will not maintain a constant tension $F$. However, to maintain a constant tension $F$ as the effective radius $r_1$ of reel 101 varies and the effective radius $r_2$ of reel 102 varies in a complementary manner, it is necessary that:

$$F = T_1/r_1 = T_2/r_2 \qquad (1)$$

wherein $T_1$ is the torque exerted on reel 101 by motor 10 and $T_2$ is the torque exerted on reel 102 by motor 12. Furthermore, the linear velocity v of web 103 is a function of the effective radius of a reel and the angular velocity $\omega$ of that reel whereby $v = r\omega$. Thus, to maintain a constant velocity $v$, it is necessary that:

$$r_1\omega_1 = r_2\omega_2 = C \quad (2)$$

wherein $\omega_1$ is the angular velocity of reel 101, $\omega_2$ is the angular velocity of reel 102 and $C$ is a constant value.

If motor 12 is energized, for example, to drive reel 102 as a take up reel, then the tension in web 103 may be maintained as a function of the torque exerted on reel 101, or $F = T_1/r_1$. It is known that the torque developed by a motor, such as a DC motor, is directly proportional to the armature current I flowing therein such that $T = AI$ wherein $A$ is a motor constant. Hence, the tension in web 103 may be expressed as $F = AI_1/r_1$. Substituting equation (2) into this expression yields:

$$F = AI_1\omega_1/C$$

and $$I_1 = FC/A\omega_1 \quad (3)$$

Since the tension $F$ is to be maintained substantially constant and since $A$ and $C$ are constant values, then web tension may be maintained at a substantially constant value if the current supplied to motor 10 is:

$$I_1 = K/\omega_1 \quad (4)$$

where $K$ is a constant value dependent upon $F$, $A$ *and* $C$. Of course, if the direction of transport is reversed such that reel 101 is driven as the take up reel by motor 10, then constant tension may be attained if the current $I_2$ supplied to motor 12 is expressed as $I_2 = K/\omega_2$. It is noted that the current components $I_1$ and $I_2$ are applied to motors 10 and 12, respectively, to provide a reverse torque to said motors when the motors assume the configuration of supply reel drive motors. Thus, if web 103 is transported from reel 102 to reel 101, then motor 10 is here operating to drive the take up reel 101 and reel 102 acts as the supply reel. Current $I_2$ now supplied to motor 12 provides a reverse torque at motor 12 to oppose the counterclockwise rotation thereof. Hence, tension is exerted on the web 103 and is maintained substantially constant by varying $I_2$ as the effective radius $r_2$ of reel 102 decreases. Similarly, if web 103 is transported from reel 101 to reel 102, then motor 12 now operates to drive the take up reel 102 and reel 101 acts as the supply reel. Current $I_1$ supplied to motor 10 provides a reverse torque at motor 10 to oppose the clockwise rotation thereof. Tension is thus exerted on web 103 and is maintained substantially constant by varying $I_1$ as the effective radius $r_1$ of reel 101 decreases.

The foregoing technique of maintaining substantially constant tension in web 103 may be implemented by the tension control system illustrated in block diagram form in FIG. 2. As shown, the control system comprises motor 10 mechanically coupled to reel 101 and motor 12 mechanically coupled to reel 102 and includes speed indicating means 104 and 105, inversion circuit means 106 and 107, summing means 108 and 109 and amplifiers 110 and 111. Also illustrated is block 100 identified as "servo system" to represent the regulating system adapted to control the speed of motors 10 and 11 and may correspond to the system previously described in detail with respect to FIG. 1 or the system disclosed in aforementioned copending application Ser. No. 329,056. Servo system 100 may thus include aforedescribed reference means 14, error signal generating means 16 and amplifying means 18. As is understood, the servo system 100 is adapted to generate control signals to selectively determine the energization of motors 10 and 12 such that reels 101 and 102 are driven in a first or second direction to transport web 103 therebetween at a desired velocity. Although the tension control system is not dependent upon the operation of servo system 100 to achieve substantially constant web tension, the tension control system will nevertheless be described in its preferred combination with the servo system.

Speed indicating means 104 is coupled to motor 10 and is adapted to generate a signal having a magnitude and polarity indicative of the angular velocity of the motor. Hence, speed indicating means 104 is capable of providing a signal directly proportional to the angular velocity $\omega_1$ of reel 101. The speed indicating means may comprise a conventional tachometer device mechanically coupled to the armature of motor 10 and serving to develop a current, for example, having a magnitude representative of the angular velocity $\omega_1$. Alternatively, the angular velocity may be represented by a proportional voltage. It is apparent that the particular nature of the tachometer device which may comprise speed indicating means 104 is not essential for a complete understanding of the block diagram of FIG. 2. Hence, any conventional tachometer device, such as a voltage or current generator, a pulse generating optical or magnetic transducer, or the like, may be employed. Alternatively, the signal provided by speed indicating means 104 to represent the angular velocity $\omega_1$ of reel 101 may be the sampled back EMF induced in motor 10. In this configuration, speed indicating means 104 may comprise any conventional device capable of sampling and providing a representation of the back EMF of an operating motor. It is contemplated that the speed indicating means may include sample and hold means 32 of FIG. 1. A more detailed description of such speed indicating means is provided in copending Application Ser. No. 329,055, filed on Feb. 2, 1973. The alternative configuration of speed indicating means 104 is electrically coupled to the armature of motor 10 to derive a voltage or current having a magnitude directly proportional to the angular velocity $\omega_1$ of reel 101 and a polarity representing the direction of rotation of the reel.

The output terminal of speed indicating means 104 is coupled in common relationship to servo system 100 and to inversion circuit 106. Servo system 100 is adapted to utilize the representation of the angular velocity of reel 101 to generate a control signal whereby the energization of motors 10 and 12 are regulated such that the speed of reels 101 and 102 conform to desired values. The servo system may thus correspond to the exemplary embodiment previously described with respect to FIG. 1. An output terminal of servo system 100 is coupled to summing means 108; the summing means including an additional input terminal to which is coupled inversion circuit 106. The inersion circuit is capable of generating an output signal that is inversely proportional to the magnitude of the input signal applied thereto. Thus if a voltage generated by speed indicating means 104 is representative of the angular velocity $\omega_1$, then inversion circuit 106 is adapted to generate a voltage proportional to $1/\omega_1$. Similarly, if a current generated by speed indicating means 104 is representative of the angular velocity $\omega_1$, then inversion circuit 106 is adapted to generate a current proportional to $1/\omega_1$.

Summing means 108 is adapted to respond to the voltages applied to the respective input terminals thereof to produce a corresponding output voltage in response to either or both applied voltages, or, alternatively, to respond to the currents applied thereto to produce a corresponding output current in response to either or both applied currents. The summing means may, therefore, comprise a conventional analog summing device well known to those of ordinary skill in the art, such as an operational amplifier disposed in summing configuration, a plurality of resistors interconnected at a summing junction, or other well known adder circuit. Alternatively, the summing means may comprise a conventional analog "OR" circuit. The output of summing means 108 is coupled to the armature of motor 10 via amplifier 110. The amplifier serves to supply the motor with an energizing current when web 103 is to be transported to reel 101 and with a reverse biasing current component when web 103 is to be transported to reel 102. Accordingly, if summing means 108 produces a current at the output terminal thereof, amplifier 110 may comprise a conventional current amplifier. If a voltage is produced at the output terminal of summing means 108, amplifier 110 may comprise a conventional transistor amplifier or other current injection device capable of supplying motor 10 with operating or biasing current of sufficient magnitude. Furthermore, the current supplied by amplifier 110 is adapted to be compatible with motor 10 such that a direct current is supplied if the motor is a DC motor and, similarly, an alternating current is supplied if the motor is an AC motor. In a preferred embodiment, motors 10 and 12 are DC motors.

Speed indicating means 105, inversion circuit 107, summing means 109 and amplifier 111 are interconnected in a manner similar to the aforedescribed corresponding elements 104, 106, 108 and 110 and are similar to construction thereto. Accordingly, speed indicating means 105 is adapted to generate a signal having a magnitude and polarity proportional to the angular velocity $\omega_2$ of reel 102. This signal is utilized by servo system 100 to produce a control signal for regulating the operation of motors 10 and 12 to attain desired speeds. Inversion circuit 107 is capable of operating upon the signal generated by speed indicating means 105 to derive a signal proportional to $1/\omega_2$, i.e., inversely proportional to the angular velocity of reel 102. Summing means 109 is adapted to respond to the signals applied thereto by servo system 100 and inversion circuit 107 and to provide amplifier 111 with a corresponding signal. The amplifier serves to supply motor 12 with operating or biasing current of sufficient magnitude.

Diodes, not identified by specific reference numerals, are disposed throughout the circuit illustrated in FIG. 2 to represent that the illustrated circuit is unidirectional and, therefore, responsive only to signals of predetermined polarities, e.g., positive.

It is recalled from the description of the control system of FIG. 1 that operating current is selectively supplied to motors 10 and 12. Thus, when web 103 is to be transported from reel 102 to reel 101, motor 10 is supplied with energizing current to drive reel 101 in a counterclockwise direction. Conversely, when web 103 is to be transported from reel 101 to reel 102, motor 12 is supplied with energizing current to drive reel 102 in a clockwise direction. Consequently, servo system 100 may include switching means to permit a single output terminal of the servo system to be switchably coupled to motors 10 and 12 in accordance with the desired direction of web transport. Similarly, since the apparatus illustratively depicted in FIG. 2 is adapted to maintain substantially constant tension by providing a reverse torque to the supply reel drive motor, suitable switching means, not shown, may be provided to eliminate redundant components and to switchably utilize a single circuit comprised of an inversion circuit and an amplifier to develop a reverse biasing current. Thus, if, for example, motor 10 is energized to drive reel 101, a reverse biasing current inversely proportional to $\omega_2$ may be supplied by the inversion circuit and amplifier to motor 12 to oppose the rotation of the motor. Conversely, if motor 12 is energized to drive reel 102, a reverse biasing current inversely proportional to $\omega_1$ may be supplied by the inversion circuit and amplifier to motor 10 to oppose the rotation of the motor. The switching means may comprise commercially available multiplexing circuits.

The operation of the tension control system represented by the block diagram of FIG. 2 will now be described. Let it be assumed that servo system 100 is activated to transport web 103 from reel 102 to reel 101 at a substantially constant linear velocity. Accordingly, a control signal is applied by the servo system to summing means 108 and then to amplifier 100 whereby an energizing current is supplied to motor 10. Consequently, motor 10 is sufficiently energized to drive reel 101 in a counterclockwise direction. The angular velocity of reels 101 and 102 are indicated by speed indicating means 104 and 105 and speed indicating signals are applied thereby to servo system 100 whereat a comparison between actual and desired velocity is effected and deviations in $\omega_1$ and $\omega_2$ from desired velocities are eliminated. The speed indicating signal produced by speed indicating means 104 is additionally applied to inversion circuit 106. Inversion circuit 106 responds to the signal applied thereto to derive a signal inversely proportional to the angular velocity of reel 101, and thus representative of $1/\omega_1$. It will here be assumed that the polarity of the inversely proportional signal derived by inversion circuit 106 is sufficient to reverse bias the diode coupled thereto. Hence, the inversely proportional signal is not applied to summing means 108. Nevertheless, it should be recognized that the operation of servo system 100 is effective to supply motor 10 with the proper energizing current irrespective of external influences thereon, to closely regulate the operation of the motor.

At this time it is recognized that reel 102 together with the armature of motor 12 are rotated in the counterclockwise direction by the paying out of web 103 therefrom. As reel 102 rotates, speed indicating means 105 produces a signal indicative of the angular velocity $\omega_2$ thereof. Inversion circuit 107 responds to this speed indicating signal to derive a signal inversely proportional to the angular velocity of reel 102 and thus representative of $1/\omega_2$. The inversely proportional signal derived by inversion circuit 107 admits of the proper polarity to forward bias the diode coupled thereto. Summing means 109 applies this inversely proportional signal to amplifier 111 whereat a reverse biasing current inversely proportional to the angular velocity of reel 102 is generated and supplied to motor 12. The current thus supplied to motor 12 is designated a reverse biasing current to suggest the function performed thereby. More particularly, this current provides a torque to motor 12 to oppose the counterclockwise rotation thereof. Of course, the magnitude of the supplied current is not comparable to the magnitude of the energizing current supplied to motor 10 to effect a balance or counter rotation of reels 101 and 102. However, the developed torque is sufficient to exert tension on web 103.

As the effective radius of reel 102 decreases, the necessary reverse torque that must be provided by motor 12 to maintain the same, or constant tension in web 103 likewise decreases. It is recognized, from equation (2) above, that as the effective radius $r_2$ decreases, the angular velocity $\omega_2$ of reel 102 increases. However, the inversely proportional signal derived by inversion circuit 107 decreases. Thus, the reverse biasing current supplied by amplifier 111 to motor 12 also decreases to achieve a corresponding variation in the reverse torque. Consequently, substantially constant tension is maintained in web 103 as the web is transported from reel 102 to reel 101.

If the servo system 100 is activated to transport web 103 from reel 101 to reel 102 at a substantially constant linear velocity, it is appreciated that a control signal is applied to summing means 109 and then to amplifier 111 whereby an energizing current is supplied to motor 12. Consequently, motor 12 is sufficiently energized to drive reel 102 in a clockwise direction. The operation of speed indicating means 105, inversion circuit 107, summing means 109 and amplifier 111 is now substantially similar to the aforedescribed operation of speed indicating means 104, inversion circuit 106, summing means 108 and amplifier 110. Furthermore, as reel 101 rotates to supply web 103 to reel 102, speed indicating means 104 produces a signal indicative of the angular velocity $\omega_1$ thereof. Inversion circuit 106 derives a signal inversely proportional to the angular velocity of reel 101 and thus representative of $1/\omega_1$. The inversely proportional signal is applied to amplifier 110 by summing means 108 whereat a reverse biasing current inversely proportional to the angular velocity of reel 101 is generated and supplied to motor 10. Motor 10 is thus provided with a torque to oppose the clockwise rotation thereof. As is now understood, the magnitude of the reverse biasing current supplied to motor 10 decreases as the effective radius $r_1$ of reel 101 decreases to thereby maintain a substantially constant tension in web 103 as the web is transported from reel 101 to reel 102.

Although the tension control system illustrated in FIG. 2 and described hereinabove satisfactorily maintains substantially constant tension in web 103 as the velocity of the web is kept constant, or as the web is accelerated or subjected to abrupt changes in transport direction or to start and stop operations, it has been found that inversion circuits 106 and 107 are relatively expensive and complex. Such inversion circuits, also known as dividers, may be constructed of an integrated circuit multiplier device in combination with about three operational amplifiers and numerous potentiometers. Commercially available dividers may be obtained from manufacturers such as the Burr-Brown Research Corporation, Tucson, Arizona. However, in compact tape transport systems, space requirements may negate the use of inversion circuits that require many elemental components and thus consume much needed space. Accordingly, an alternative to the aforedescribed tension control system wherein constant web tension is maintained in a compact direct drive reel-to-reel web transport system has been sought.

Practical web tension control system

An investigation of the angular velocity of the take up reel as well as the angular velocity of the supply reel as a web of material is transported therebetween at a constant linear velocity indicates that the angular velocity of a reel is inversely proportional to the quantity of material thereon. That is, if the effective radius of the reel decreases, i.e., as the supply reel rotates, the angular velocity thereof increases. Conversely, as the effective radius of the reel increases, i.e., as the take up reel rotates, the angular velocity thereof decreases. FIG. 3 is a graphical representation of the angular velocity of a reel as a function of the effective radius thereof. The designations "BOW", "MOW" and "EOW" along the abscissa represent "beginning of web," "middle of web" and "end of web," respectively. The illustrated graph may be representative of the operation of reels 101 and 102. If web 103 is transported from reel 102 to reel 101, the reel 101 may be considered the take up reel and initially there is no material wound thereon. Hence, the effective radius of reel 101 is at a minimum and comprises only the hub of the reel. Consequently, it is appreciated that the angular velocity $\omega_1$ of the take up reel is a maximum when the beginning portion of the web is applied thereto.

As the web is transported to the take up reel at a substantially constant linear velocity, the quantity of material wound thereon increases and, therefore, the angular velocity $\omega_1$ decreases. Thus, when the middle portion of the web is applied to reel 101, the angular velocity thereof is as indicated in FIG. 3. Finally, the angular velocity $\omega_1$ decreases to a minimum value when the web is ultimately transported to the take up reel and the end portion of the web is applied to reel 101. The angular velocity function of reel 101 when the reel serves as a take up reel as just described is depicted by the solid curve identified as $\omega_1$.

As is appreciated, when reel 101 functions as a take up reel, reel 102 operates as a supply reel. Initially, the web is wound upon the supply reel to thereby present the reel with a maximum effective radius and, therefore, the angular velocity $\omega_2$ of reel 102 is a minimum. Thus, as the beginning portion of the web is transported to the take up reel, $\omega_2$ exhibits a minimal value while $\omega_1$ exhibits a maximal value. As web 103 is transported at a constant linear velocity, the paying out thereof decreases the effective radius of the supply reel, thus requiring an increased angular velocity $\omega_2$. When the middle portion of the web is transported to the take up reel, the effective radii of the take up and supply reels are equal and $\omega_1$ is equal to $\omega_2$. Finally, the angular velocity $\omega_2$ increases to a maximum value when the end portion of the web is transported to the take up reel and the supply reel admits of a minimal effective radius.

The angular velocity function of reel 102 when the reel serves as a supply reel as just described is depicted in FIG. 3 by the solid curve identified as $\omega_2$. As shown, if reels 101 and 102 manifest substantially the same dimensional configuration, the respective angular velocities thereof appear to be complementary as web 103 is transported from the supply reel to the take up reel.

The manner in which the inverse function of the angular velocity of a reel ($1/\omega$) varies as a web of material is paid out from the supply reel to the take up reel has also been investigated. The relationship between the inverse of the angular velocity and the effective radius of a reel is illustrated by the broken curves identified as $k/\omega_1$ and $k/\omega_2$ of FIG. 3. As shown, $k/\omega_1$ increases as $\omega_1$ decreases; that is, as the take up reel receives the web. Similarly, $k/\omega_2$ decreases as $\omega_2$ increases; that is, as the supply reel pays out the web. The graphical representation illustrates that, although the curves $\omega_1$ and $k/\omega_2$ are not congruent, the general slopes of the respective curves are similar. Likewise, curves $\omega_2$ and $k/\omega_1$ exhibit similar general slopes. Furthermore, it has been discovered that for most practical applications that require an indication of $1/\omega_1$, for example, a signal representing $\omega_2$ may be utilized. Also, if an indication of $1/\omega_2$ is required, a signal representing $\omega_1$ may be employed.

The foregoing is turned to account by the novel constant web tension maintaining technique of the present invention, an exemplary embodiment of which is illustrated in FIG. 4. The drawing depicts a constant web tension control system for maintaining substantially constant tension in web 103 as the web is transported between reels 101 and 102 and includes speed indicating means 104 and 105, amplifying means 201 and 202, summing means 108 and 109 and amplifiers 110 and 111. Also shown is servo system 100. Those elements identified by the reference numerals that identify corresponding elements illustrated in FIG. 2 are identical thereto and, therefore, in the interest of brevity, further description is not provided. Consequently, it is readily appreciated that the linear velocity of web 103 is controlled by servo system 100 in cooperation with speed indicating means 104 and 105.

The web tension control system is provided with amplifying means 201 having an input coupled to speed indicating means 105 and an output coupled to summing means 108; and with amplifying means 202 having an input coupled to speed indicating means 104 and an output coupled to summing means 109. The previously described inversion circuits 106 and 107 have here been eliminated. Amplifying means 201 and 202 are adapted to amplify the respective signals applied thereto by a predetermined constant factor $k$. The amplifying means exhibit substantially linear amplification functions and the predetermined constant factor $k$ may be greater than or less than unity. Additionally the amplifying means may introduce a polarity inversion in the amplified signals. Amplifying means 201 and 202 are adapted to be compatible with speed indicating means 104 and 105, respectively. Hence, if the signals provided by the speed indicating means are voltage signals, the amplifying means may be voltage amplifiers to supply the summing means coupled thereto with amplified voltages directly proportional to the voltage signals provided by the respective speed indicating means. Similarly, if the amplifying means are supplied with current signals, said amplifying means may be current amplifiers to supply the summing means coupled thereto with amplified currents directly proportional to the current signals provided by the respective speed indicating means. Of course, each amplifying means may be any other conventional amplifying device, such as that which generates an amplified current in response to an applied voltage signal.

Diodes, not identified by specific reference numerals, are disposed throughout the circuit illustrated in FIG. 4 to represent that the illustrated circuit is undirectional and, therefore, responsive to signals only of predetermined polarity, e.g., positive.

In operation, amplifying means 201 or 202 is adapted to derive a signal directly proportional to the angular velocity of the take up reel, which derived signal is applied as a reverse biasing current to the supply reel drive motor. If it is assumed that servo system 100 energizes motor 10 to drive reel 101 in the counterlcockwise direction whereby web 103 is transported to reel 101, speed indicating means 104 produces a voltage or current signal indicative of the angular velocity $\omega_1$ of reel 101. The produced signal is applied to amplifying means 202 whereat an amplified voltage or current directly proportional to the angular velocity $\omega_1$ is obtained. The amplified voltage or current is coupled to amplifier 111 by summing means 109 and a reverse biasing current directly proportional to the angular velocity of reel 101 is generated and supplied to motor 12. It is recalled that the reverse biasing current provides a torque to motor 12 to oppose the counterclockwise rotation thereof, thus exerting a tension on web 103. By referring to FIG. 3, it is appreciated that a reverse biasing current directly proportional to the angular velocity $\omega_1$ of the take up reel (in this instance reel 101) is substantially similar to a reverse biasing current inversely proportional to the angular velocity $1/\omega_2$ of the supply reel. Hence, the improved web tension control system serves to maintain a substantially constant tension in web 103 as the web is transported from reel 102 to reel 101.

Let it now be assumed that servo system 100 energizes motor 12 to drive reel 102 in the clockwise direction whereby web 103 is transported to reel 102. Speed indicating means 105 produces a voltage or current signal indicative of the angular velocity $\omega_2$ of reel 102. The produced signal is applied to amplifying means 201 whereat an amplified voltage or current directly proportional to the angular velocity $\omega_2$ is obtained. The amplified voltage or current is coupled to amplifier 110 by summing means 108 and a reverse biasing current directly proportional to the angular velocity of reel 102 is generated and supplied to motor 10. Consequently, motor 10 is provided with a torque to oppose the clockwise rotation thereof, thereby exerting a tension on web 103. Since a reverse biasing current that is a function of $\omega_2$ is substantially similar to a reverse biasing current that is a function of $1/\omega_1$, the illustrated web tension control system is seen to maintain a substantially constant tension in web 103 as the web is transported.

It may now be appreciated that although the output signals generated by amplifying means 201 and 202 may be simultaneously applied to summing means 108 and 109, respectively, substantially constant tension is advantageously maintained in web 103 when a reverse torque is developed in the supply reel drive motor. Accordingly, although not shown herein, the present invention may be modified to include a switching device in the series circuit comprising speed indicating means 105, amplifying means 201 and summing means 108 and a switching device in the series circuit comprising speed indicating means 104, amplifying means 202 and summing means 109. The switching devices, which may be constructed of conventional, commercially available multiplexing circuits, may be selectively activated by servo system 100 such that a reverse biasing current is supplied to motor 10 when reel 100 functions as a supply reel and a reverse biasing current is supplied to motor 12 when reel 102 functions as a supply reel.

In an actual reduction to practice of the embodiments of the web tension control systems illustrated and described herein, a substantially constant tension of approximately 4 ounces has been maintained by initially establishing the inversion circuits 106, 107 or amplifying means 201, 202 to provide a reverse biasing current of approximately 200 milliamps when the middle portion of web 103 is transported to the take up reel.

While the invention has been particularly described with reference to a web transport system admitting of particular application to compact tape transport systems, such as the compact tape cassette, it will be obvious that this invention may be utilized with any system wherein a web of material is transported from a supply reel to a take up reel. Consequently, it is apparent that the foregoing and various other changes and modifications in form and details may be made without departing from the spirit and scope of the invention. It is, therefore, intended that the appended claims be interpreted as including all such changes and modifications.

What is claimed is:

1. A method of maintaining substantially constant tension in a web bi-directionally transported between a supply reel and a take up reel, comprising the steps of:

driving said web from said supply reel to said take up reel;

generating a signal directly proportional to the angular velocity of said take up reel;

amplifying said generated signal by a pre-determined constant factor to obtain an amplified current having a magnitude directly proportional to said take up reel angular velocity; and applying said derived current as a reverse biasing current to a drive motor mechanically coupled to said supply reel to thereby provide a reverse torque to said drive motor whereby tension is exerted on said web.

2. In a tape transport control system, improved apparatus for maintaining substantially constant tension in said tape as said tape is transported from a supply reel to a take up reel, comprising:

means for driving said tape from said supply reel to said take up reel;

motor means mechanically coupled to said supply reel;

speed indicating means for producing a signal indicative of the angular velocity of said take up reel;

current generating means coupled to said speed indicating means and responsive to said signal for generating a current having a magnitude directly proportional to said take up reel angular velocity; and applying means coupled to said current deriving means for applying said derived current to said motor means as a reverse biasing current for said motor means to provide a reverse torque to said motor means to oppose the rotation thereof.

3. In a tape transport system wherein first and second regulated electric motors are coupled in driving relation to first and second reels, respectively, to transport tape bi-directionally between said first and second reels, a method of maintaining substantially constant tension in said tape, comprising the steps of:

generating first and second currents proportional to the respective angular velocities of said first and second reels; and applying at least one of said first and second currents to at least one of said first and second motors as a reverse biasing current therefor to provide a reverse torque to said at least one motor to oppose the rotation of said at least one motor.

4. The method of claim 3 wherein said step of applying at least one current to at least one motor comprises the step of applying said reverse biasing current to said first motor when said tape is transported from said first reel to said second reel and applying said reverse biasing current to said second motor when said tape is transported from said second reel to said first reel.

5. The method of claim 4 wherein said step of generating first and second currents comprises the steps of:

generating a first current directly proportional to the angular velocity of said first reel; and generating a second current directly proportional to the angular velocity of said second reel.

6. The method of claim 5 wherein said step of applying said reverse biasing current to said first motor comprises applying said second current to said first motor when said tape is transported from said first reel to said second reel and said step of applying said reverse biasing current to said second motor comprises applying said first current to said second motor when said tape is transported from said second reel to said first reel.

7. A method of maintaining substantially constant tension in tape that is bi-directionally transported between a first reel driven by a first motor and a second reel driven by a second motor, comprising the steps of:

deriving a first current related to the angular velocity of said first reel when said tape is driven from said second reel to said first reel;

amplifying said first current by a predetermined constant factor to obtain an amplified current having a magnitude directly proportional to said angular velocity of said first reel;

deriving a second current related to the angular velocity of said second reel when said tape is driven from said first reel to said second reel;

amplifying said second current by a predetermined constant factor to obtain an amplified current having a magnitude directly proportional to said angular velocity of said second reel;

applying said first current to said second motor as a reverse biasing current for said second motor to provide a reverse torque to said second motor to oppose the rotation thereof; and applying said second current to said first motor as a reverse biasing current for said first motor to provide a reverse torque to said first motor to oppose the rotation thereof.

8. The method of claim 7 wherein said step of deriving a first current comprises the step of generating a current directly proportional to the angular velocity of said first reel and said step of deriving a second current comprises the step of generating a current directly proportional to the angular velocity of said second reel.

9. In a web transport control system wherein said web is bi-directionally transportable between first and second reels, the combination comprising:

a first motor mechanically coupled to said first reel for driving said web in a first direction;

a second motor mechanically coupled to said second reel for driving said web in a second direction;

spped control means coupled to said first and second motors for supplying control currents to said first and second motors, respectively, to control the respective operating speeds of said first and second motors;

means for generating first and second currents proportional to the angular velocities of said first and second reels, respectively; and means coupled to said means for generating for supplying at least one of said first and second currents as a reverse biasing current component to at least one of said first and second motors to provide a reverse torque to said at least one motor to oppose the rotation thereof.

10. The combination of claim 9 wherein said means for supplying a reverse biasing current component comprises first means for supplying a reverse biasing current component to said first motor when said web is driven in said second direction and second means for supplying a reverse biasing current component to said second motor when said web is driven in said first direction.

11. The combination of claim 10 wherein said means generating first and second currents comprises:

first and second speed indicating means coupled to said first and second motors, respectively, for producing signals indicative of the angular velocities of said first and second reels;

first current generating means coupled to said first speed indicating means for generating a first current directly proportional to the angular velocity of said first reel; and second current generating means coupled to said second speed indicating means for generating a second current directly proportional to the angular velocity of said second reel.

12. The combination of claim 11 wherein said first means for supplying a reverse biasing current component comprises first adding means having input terminals coupled to said speed control means and said second current generating means for receiving said second current and a control current and for selectively supplying said second current and said control current to said first motor; and wherein said second means for supplying a reverse biasing current comprises second adding means having input terminals coupled to said speed control means and said first current generating means for receiving said first current and a control current and for selectively supplying said first current and said control current to said second motor.

* * * * *